US012626293B1

(12) United States Patent
Mahoney et al.

(10) Patent No.: US 12,626,293 B1
(45) Date of Patent: May 12, 2026

(54) SYSTEM AND METHOD FOR REAL-TIME AUGMENTED REALITY-BASED VISUALIZATION, CUSTOMIZATION, AND TRANSACTION OF INTERIOR DESIGN

(71) Applicants:Jessica Mahoney, Miami, FL (US);
Geraldine Weiner, Miami, FL (US);
Leonard Holzer, Boyton Beach, FL
(US)

(72) Inventors: Jessica Mahoney, Miami, FL (US);
Geraldine Weiner, Miami, FL (US);
Leonard Holzer, Boyton Beach, FL
(US)

( * ) Notice: Subject to any disclaimer, the term of this
patent is extended or adjusted under 35
U.S.C. 154(b) by 0 days.

(21) Appl. No.: 19/235,621

(22) Filed: Jun. 12, 2025

(51) Int. Cl.
*G06Q 30/00* (2023.01)
*G06Q 30/0601* (2023.01)

(52) U.S. Cl.
CPC ... *G06Q 30/0631* (2013.01); *G06Q 30/06433*
(2025.08)

(58) Field of Classification Search
None
See application file for complete search history.

(56) References Cited

U.S. PATENT DOCUMENTS

| | | | | |
|---|---|---|---|---|
| 2018/0374276 A1* | 12/2018 | Powers | ............... | G06T 17/205 |
| 2021/0248669 A1* | 8/2021 | Wade | .................... | G06N 20/00 |
| 2021/0365603 A1* | 11/2021 | Gu | ........................... | G06N 3/09 |
| 2024/0012963 A1* | 1/2024 | Kaya | ................. | G06Q 30/0643 |
| 2024/0119316 A1* | 4/2024 | Tu | ............................ | G06N 5/04 |
| 2024/0193886 A1* | 6/2024 | Sadalgi | .................. | G06T 19/20 |

* cited by examiner

*Primary Examiner* — Mila Airapetian
(74) *Attorney, Agent, or Firm* — Pennington Oliak PLLC

(57) ABSTRACT

The invention relates to a software platform designed for real-time augmented reality (AR)-based visualization, customization, and transaction of home furnishings. The platform integrates AR technology with artificial intelligence (AI) and machine learning (ML) to significantly enhance user interaction. The invention provides dynamic virtual product placement, personalized design recommendations, and streamlined transaction processes. The system and methodology of the invention allows users to capture and digitize space dimensions, manipulate virtual furnishings in real-time, and directly purchase integrated designs. By leveraging AI and ML, the platform offers tailored solutions and adaptive functionalities to improve user experience and decision-making in home decor and furnishings.

22 Claims, 7 Drawing Sheets

26

| # | Features | Layer | MVP | Date |
|---|---|---|---|---|
| 1 | Add /Products to a space with utility patented technology | Mobile | 1 | Jan - March 2025 |
| 2 | Create a Space | Mobile | 1 | Jan - March 2025 |
| 3 | Detect Existing objects (stairs, windows, doors, furniture) | Mobile / ML | 1 | Jan - March 2025 |
| 4 | View products in room | Mobile | 1 | Jan - March 2025 |
| 5 | Take a snapshot | Mobile | 1 | Jan - March 2025 |
| 7 | Scan Room for Exact Measurements | Backend | 2 | March - April 2025 |
| 8 | User creation (Life Cycle) | Backend | 2 | March - April 2025 |
| 9 | Product Description and additional information | Backend | 2 | March - April 2025 |
| 10 | Instant Quotation | Backend | 2 | March - April 2025 |
| 11 | Customer Life Cycle | Backend | 2 | March - April 2025 |
| 12 | Add products to a Collection (Shopping Cart) | Mobile | 2 | March - April 2025 |
| 13 | Identify what the customer wants (Products) | Backend / ML | 3 | April - June 2025 |
| 14 | Recommendation Engine | Backend / ML | 3 | April - June 2025 |
| 15 | Schematics of the room (Floor plan) | Mobile | 3 | April - June 2025 |
| 16 | Purpose of the room (e.g. Kid's room) | Mobile / Backend / ML | 3 | April - June 2025 |
| 17 | AI for recommendations | Mobile / Backend / AI | 3 | |
| 18 | Remove objects in the scanned virtual space | Mobile | 3 | April - June 2025 |
| 19 | The app should provide 3 options of the layout | Mobile / Backend / ML | 3 | April - June 2025 |
| 20 | Share Space with third Parties | Backend / Mobile | 3 | April - June 2025 |
| 21 | Work with Personal Designer | Backend / Mobile | 3 | April - June 2025 |

SYSTEM AND METHOD FOR REAL-TIME AUGMENTED REALITY-BASED VISUALIZATION, CUSTOMIZATION, AND TRANSACTION OF INTERIOR DESIGN

BACKGROUND OF THE INVENTION

Field of the Invention

The present invention pertains to the domain of software applications utilized in the fields of Interior decorating, design and architecture; Furnishing retailers; Art galleries and Museums; Luxury assets (such as yachts, planes, boats etc.) Real estate (such as all spaces, living, amenities, workspaces, showrooms, under Residential, Commercial, Industrial, Hospitality, Brokerage, Developments; as well as home insurance; and high-tech facilities and warehouses. More specifically, the invention relates to a software-based system and methodology that employs augmented reality (AR), artificial intelligence (AI), and machine learning (ML) for the enhancement of visualization, customization, and acquisition processes related to (furniture, lighting, decor, rugs, art, surface materials (such as wall materials, flooring materials, stone, glass, metal, woods, etc.), hardware, cabinetry, millwork, electrical, sound, acoustical equipment & materials, ISP (Internet Service Provider), security equipment (wires, boxes and routers), Heating & Cooling equipment (HVAC) and or any other materials needed to be specified for the design.)
ı

Description of the Related Design

Traditionally, designing a home or space has been an inefficient and often frustrating process for homeowners and or Owners. Unless they have professional training in interior design, most people struggle to visualize how different furnishings, fabrics, materials, and colors will come together in their space. Historically, homeowners would visit furniture stores, pick up tear sheets with product images and measurements, and maybe even take home small fabric swatches. Then, they would return home and attempt to imagine how these pieces would fit within their space. This process was incredibly limiting-relying on a small piece of fabric and a two-dimensional tear sheet makes it nearly impossible to accurately picture how the final design will look.

In the field of interior design, professional designers typically bring samples of fabrics and other materials and rely on the imagination of the customer to imagine what walls, surfaces, furnishings, carpets and drapes would look like in a particular room or area. To make matters more complicated, homeowners would have to measure their space manually, using a tape measure to determine whether a piece of furniture would fit. However, the majority of people struggle with spatial visualization, making it easy to miscalculate or misunderstand proportions. This often results in frustration, costly mistakes, and frequent returns when furniture doesn't fit as expected.

Beyond the challenge of visualization, the traditional process requires extensive research and shopping. Homeowners must visit multiple local furniture stores, browse countless websites, and sift through an overwhelming number of options to find pieces that match their style and budget. Even after all this effort, they still risk making choices that don't work together cohesively.

Another traditional approach is hiring an interior designer. In this case, the designer would visit the homeowner's space, assess their needs, and guide them through the shopping process by introducing them to stores that match their style and budget. The designer would accompany them while shopping, helping them select furniture and materials.

Once the homeowner has an idea of their preferred pieces, the designer would return to their home to manually measure the space. These measurements would then be entered into AutoCAD or another design software back at the designer's office. Using this information, the designer would create a few expert layouts, ensuring that the furniture is properly scaled and arranged for optimal functionality and aesthetics.

From there, the designer would develop a rendering-a visual representation of how the space will look with the selected furniture, to scale, within the homeowner's actual space. This is often the first point in the process where the homeowner can truly see how everything will come together in a professional, cohesive way.

At this stage, the homeowner and designer may go back and forth, refining the layout and adjusting based on feedback. Once the homeowner approves the final design, the designer assists with purchasing the furniture and coordinating delivery.

While this process results in a professionally designed space, it is time-consuming, expensive, and requires multiple back-and-forth steps, making it inaccessible for many homeowners. A need exists for a better way for interior designers to work with clients to obtain their design goals and aspirations faster and more efficiently.

SUMMARY OF THE INVENTION

The invention includes a software platform for interactive augmented reality (AR) design. The platform integrates AR technology with artificial intelligence (AI) and machine learning (ML) to enhance user experience in virtual product placement, design recommendations, and transaction facilitation.
AR Engine:
In one aspect, the invention includes a novel software system and method incorporating augmented reality (AR), artificial intelligence (AI), and machine learning (ML) technologies. This system is designed to enhance the visualization, customization, and acquisition processes related to home furnishings and or decor objects listed in section [0001]. The invention addresses deficiencies in existing solutions by providing advanced features such as real-time interaction, precise scaling, and hyper-personalized recommendations.

Another aspect of the invention relates to providing a software-based system and method that integrates augmented reality (AR), artificial intelligence (AI), and machine learning (ML) technologies to enhance visualization, customization, and acquisition processes for home furnishings and decor items. The invention addresses limitations in conventional technologies by providing dynamic and interactive solutions.

The invention includes capturing room dimensions with a dimension scanning module that acquires and digitizes physical room measurements, allowing for accurate scaling of virtual objects (such as mentioned in section [0001]) to conform to these dimensions. This module also includes capabilities for detecting and mapping objects in the physical environment including but not limited to (windows, steps, hallways, and doors) (as well as existing objects) to ensure a realistic and unobstructed virtual placement of furniture and décor objects.

The invention includes real-time product manipulation through a dynamic interaction module that permits real-time addition, deletion, and modification of virtual objects within a digitalized physical environment. This module supports continuous updates as users make changes, reflecting those alterations instantly in the virtual space.

In another aspect of the invention, a snapshot and printing module allows users to capture and produce images of virtual floorplans, virtual renderings, and design configurations. This feature enables users to easily review and share their designs.

The invention includes integrated design templates where users can access and utilize pre-configured floorplan templates to streamline the design customization process. These templates offer a starting point for design and can be modified to meet specific needs.

The system and method of the invention further includes pin-to-purchase functionality that enables users to directly purchase rendered designs with integrated products through a purchase integration module, simplifying the acquisition process for purchase and delivery.

The invention provides generative AI recommendations including generative AI algorithms that provide tailored design recommendations and purchase solutions based on user preferences, room specifications, detected physical objects; and inspirational pictures (uploaded by user). This component leverages machine learning to enhance recommendation accuracy and relevance.

The invention further includes a delete physical objects option which includes an AR-based feature allowing users to delete or modify physical objects in real-time through the AR interface. This functionality enables users to visualize the impact of removing or adjusting physical items within the space, enhancing the accuracy of virtual arrangements and improving the overall design process.

Other aspects of the invention will become apparent in view of the following detailed description and claims.

BRIEF DESCRIPTION OF THE DRAWINGS

FIG. 4 is a sketch of the method capabilities.

DESCRIPTION OF THE INVENTION

Figure 1:
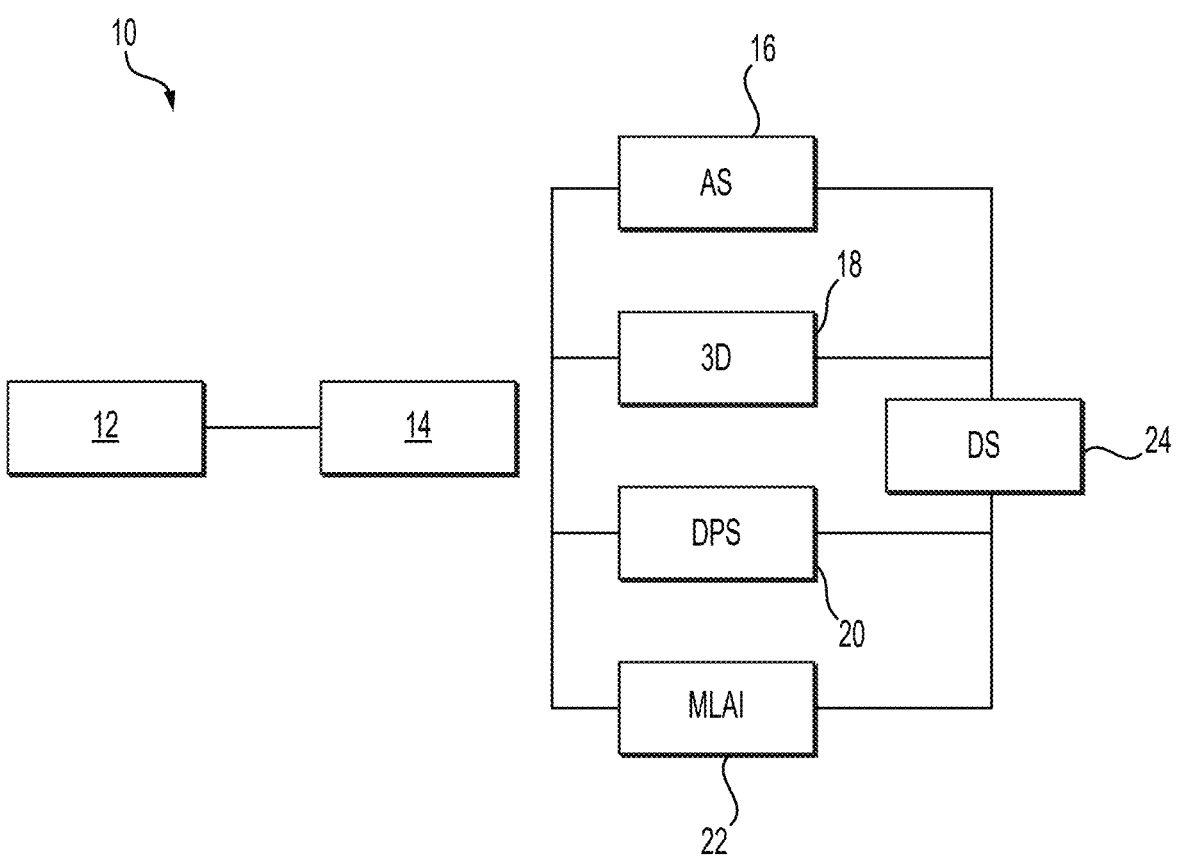
FIG. 1 is a schematic diagram of the overall architecture of the system and method of the present invention.
Figure 2:
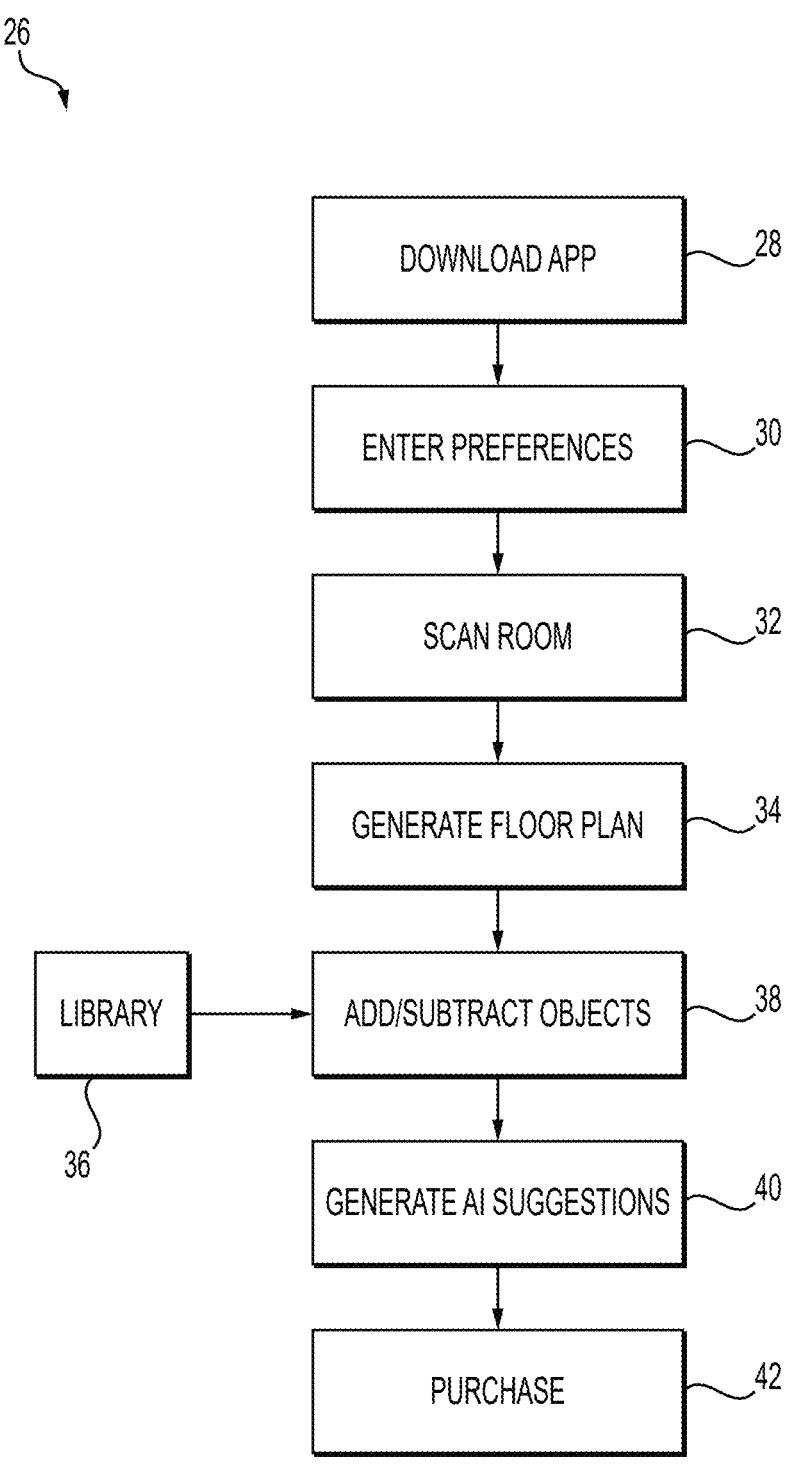
FIG. 2 is a flow chart showing operation of a preferred system of the present invention.
Figure 3:
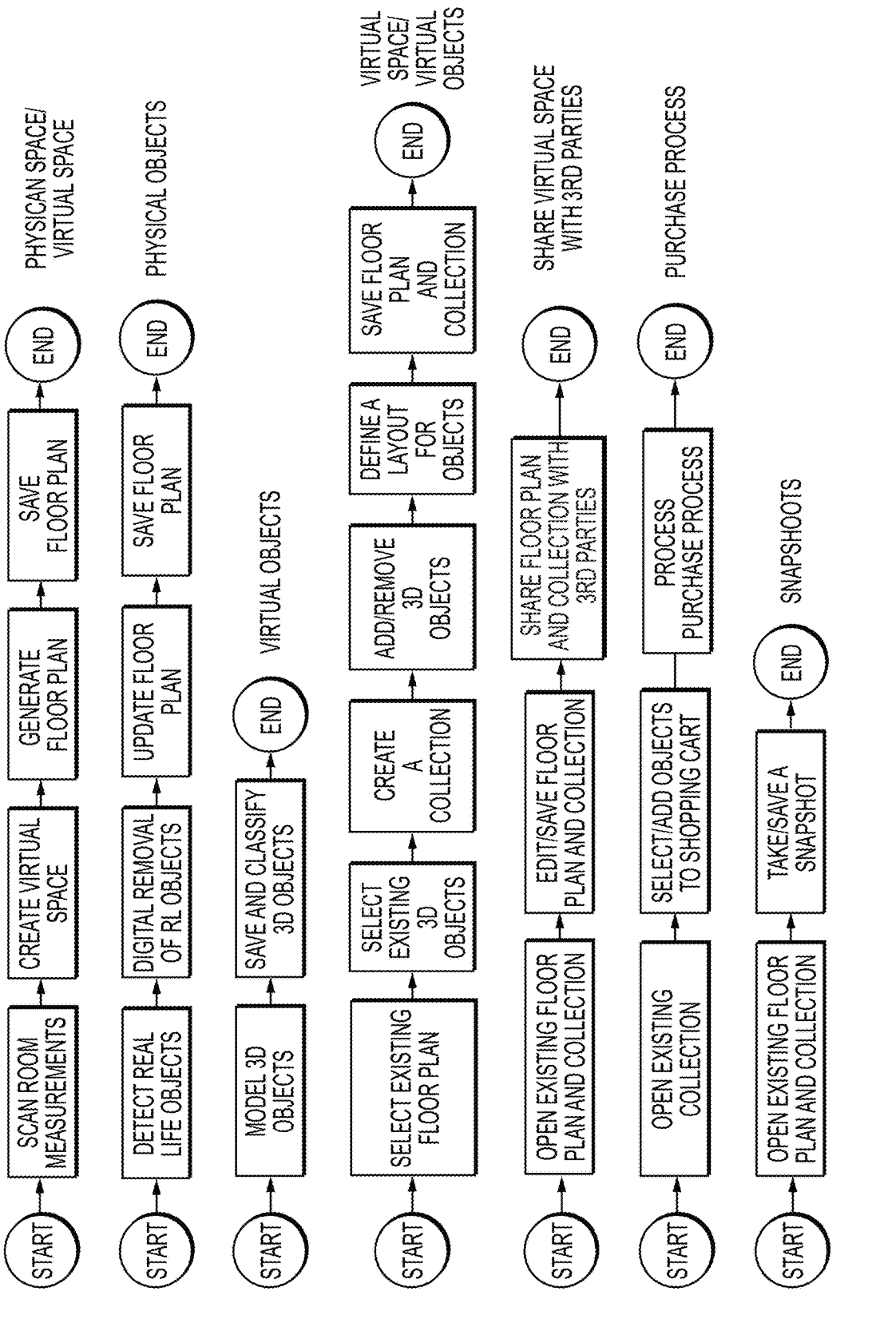
FIG. 3 is a flow chart of multiple operational flow paths incorporating various variations of the invention.
Figure 3:
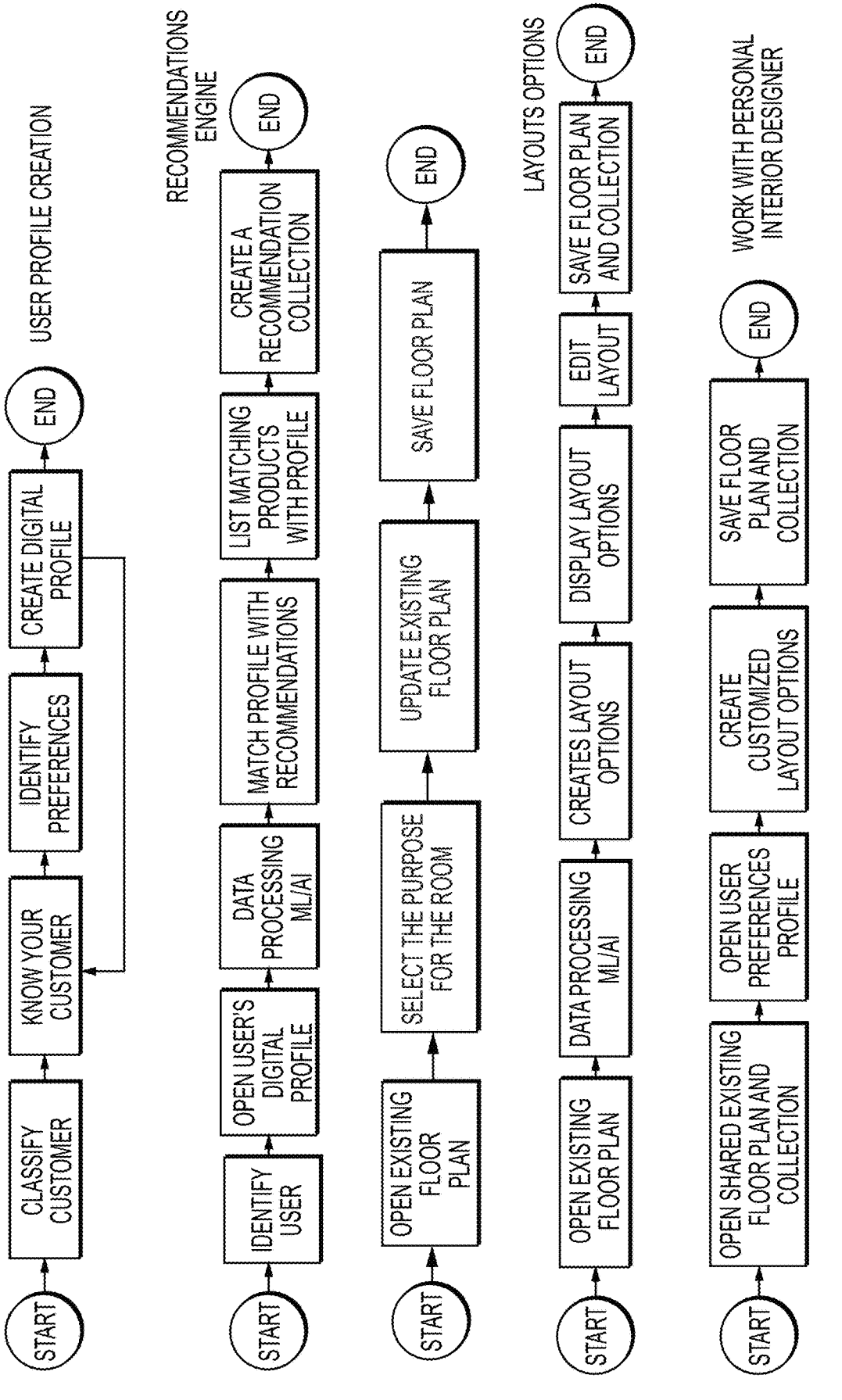
Figure 5:
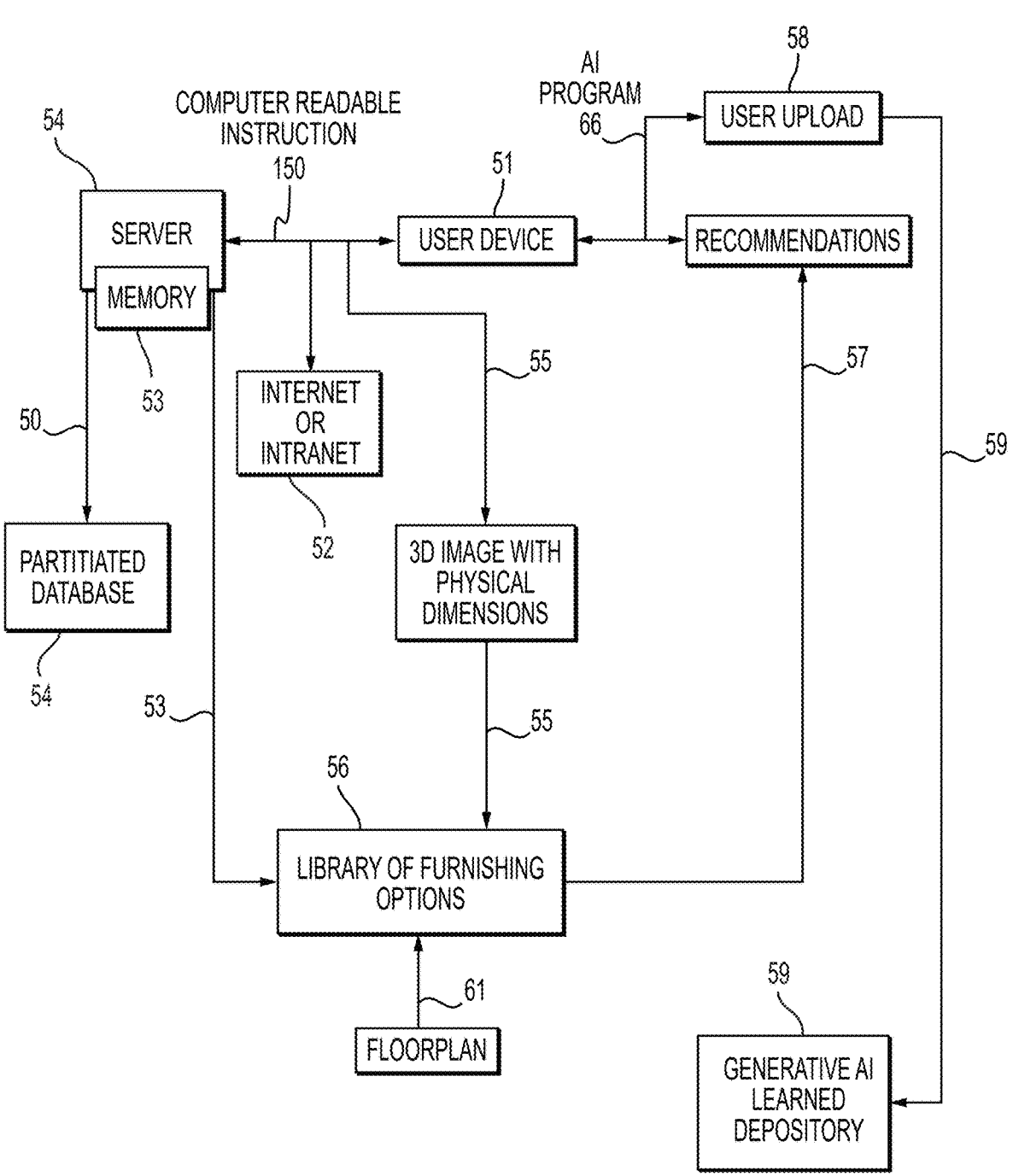
FIG. 5 is a flow chart of system interactions.
Figure 6:
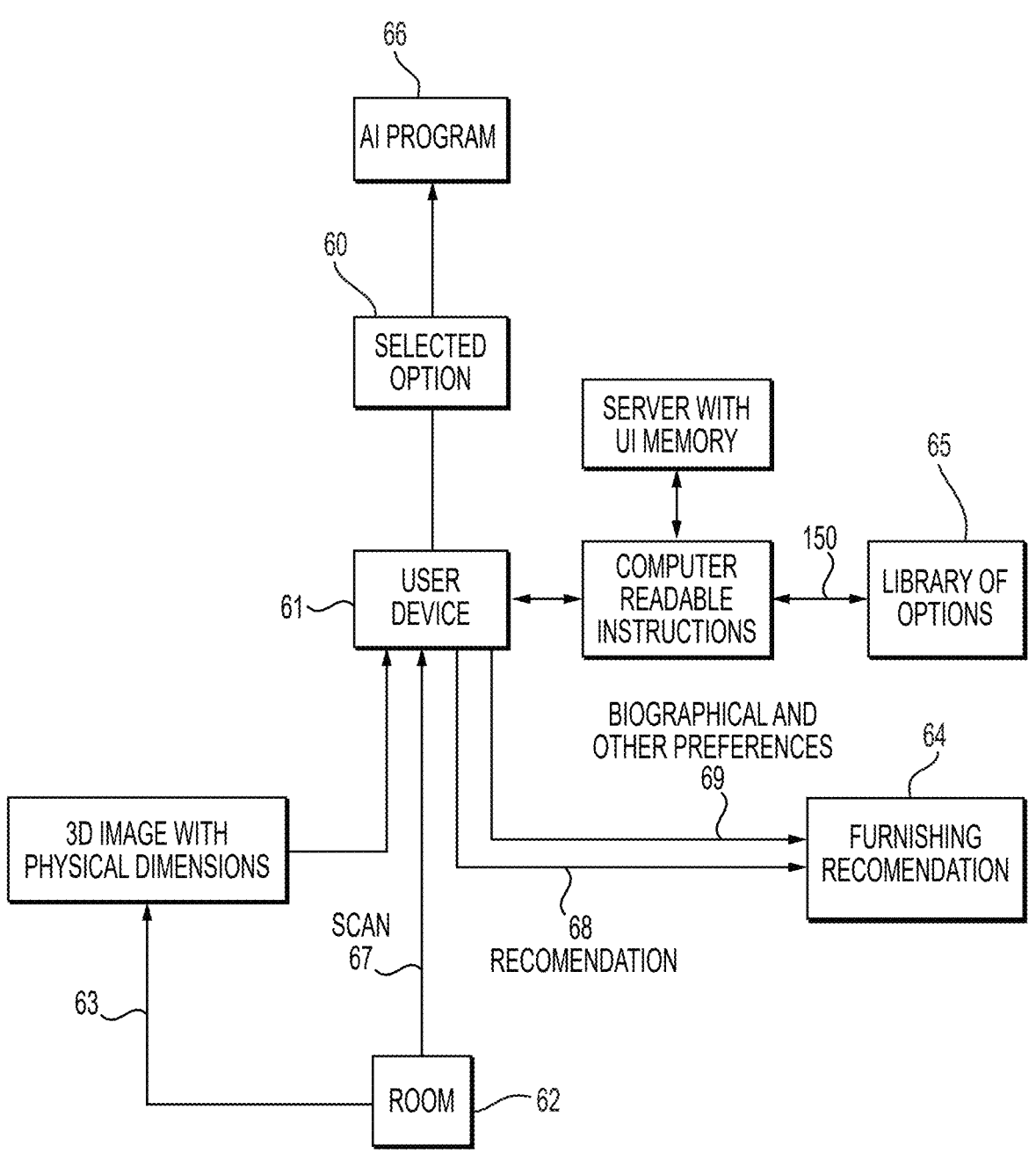
FIG. 6 is a flow chart of method interactions.

Referring to FIGS. 1-3, a system 10 of the invention includes an augmented reality AR processor 12 which interacts with a services layer 14 operably controlling an integrated services module AS 16, a 3-D modeling engine (3D) 18, data processing services (DPS) 20 and machine learning and AI engine (MLAI) 22. Data generated from each module is delivered to data storage (DS) 24 for further use in storing individual user files containing design and purchase selections. Individual files can be mined to generate marketing data that includes selections based on age, gender, income, neighborhood, zip codes and data based on correlations between user interior space dimensions (from 3D scans) and other indicators; as well as all the user information in section [0029].

Referring to FIG. 2, the invention includes a system and method for interior design, product selection and acquisition 26 which includes a downloadable application 28 which a user can obtain by visiting the website of a central processing platform, or the individual website of a furnishing/design house which offers a catalog of furnishing selections, or through ImaageQ's application's platform that connects to the catalog of furnishing selections directly. The Application 28 includes a user interface which allows user registration so that a unique file is created for each user. At the registration stage, the application 28 includes a user interface that solicits through pull down menus information about the user and the space. User information can include age, gender, height, marital status, occupation, income, budget, furnishing types, use case (such as type of space or project), quantities, art preferences, style preferences (e.g., Italian, modern, early American, etc.), and or any other information that could be used such as and not limiting to texture and material preferences, and inspirational data uploaded by user to train generative AI algorithms to help the user select furnishing based on AI generated suggestions. The process of entering biographical and other preferences is shown in FIG. 2 at 30 as entering preferences.

After entering preferences, the application interface will query the user as to whether the user's device, such as a smart phone, has a pre-loaded 3D scanning applicant which can be used to scan 32 the user's room or rooms to obtain dimensions and an augmented reality view of each space. From the scanned image or images, the application 28 can generate a floor plan 34 for further use in the design process.

The scanned room or rooms may be empty or furnished. If empty the application 28 includes in the user interface a selection key for "selecting furnishing," or "library" 36, whereupon the user can select "sofa" "chair" "end table" or other generic heading, and when clicking one of those, such as "sofa," the user is presented with a selection of sofa options generated by the generative Ai algorithms that have taken into consideration the user's biographical data entries. Such entries may include but are not limited to: education, work, relationships, types of parties, frequent guests, hours spent at various tasks, sleep preferences, activities, games, light tolerance, meal choices, etc., essentially any details a user may wish to have considered in the design process and user preferences included above in section [0029].

The application user interface will allow the user to make a selection and drop the selection into the space. Where to drop or locate the furnishing will be decided by the generative AI based on the room dimensions and user biographical information. Alternatively, the user can drop the sofa at his or her preferred location or layout the generative AI suggests. In any case where the user makes a selection of location, the location information is used to train the AI so that future suggestions made by the application will be more and more in line with the preferences of the user.

At block 38, the user's movement of a sofa or other furnishing is represented as either add or subtract an object. The user can add the sofa suggested by the generative AI, at block 40 or reject the suggestion (subtract) and either request another suggestion or chose a selection from the library 36. This process can occur iteratively until the user ends up with a desired purchase of a sofa, and iteratively, any other desired furnishing.

If the room is furnished before the process begins, the first stages of the system could include removing objects from the scanned room. The generative AI preferably has the ability to remove individual objects, from one to as much as the entire room. Without adding or subtracting furnishings, the user can opt for a "suggest rearranging" option where the generative AI can suggest taking the existing furnishings and rearranging them into a different format. The suggested rearranging feature can also suggest considering removing one furnishing and substituting a different version of the same type, such as a sofa, or a different type, such as a chair for a sofa.

At block 42, the user can elect to purchase an object of furnishing or multiple objects from the library of furnishing options. The purchase can be a single click if the user's registration process includes shipping location and payment preferences. As part of the data collection and analysis aspect of the invention, each user's file can be mined for information about what selections were turned down, which ones were selected and what expenditures were made according to gender, age, location, occupation, etc. Correlations analysis can be performed to generate useful marketing data which preferably includes correlations between square footage and housing type (apartment, condominium, townhouse, as well as spaces included in section [0001] etc.) and user demographics/biographical information.

The experience that the user will have throughout their interaction with the platform can be divided into the following phases or stages:

```
Interaction physical space or room
Creation of virtual space
Handling Objects (e.g., furnishings) in a space
Managing the distribution and arranging of objects in a space
Create a collection in a virtual space
Space management
Defining the purpose of the spaces
Recommendations for the distribution and arrangement
of objects in a space
Interaction and integration with external (customer)
object (product) catalogs
Collection Purchase Process
Request for services from a professional interior designer
User and Role Management
```

Interaction with physical space. Throughout this stage, the user will interact with the physical space or room within a home, showroom, workspace, etc., (described in section) [0001], through the use of their mobile device (e.g., Android or IOS). The goal is to capture and geometrically scan the existing space or room in order to accurately define it's dimensions. There will be an App that will occupy the hardware of the user's device for the following actions:

```
Identify the walls, ceiling and floor of a room.
Identify the dimensions of each wall, ceiling,
and floor (Length x width x height).
Identification of objects in the physical space
(windows, doors, hallways, stairs, and well as
existing furnishings such as lamps, tables, chairs, etc.),
```

Creation of a virtual space. Once the user has finished scanning with their physical space or room, a virtual architectural floorplan is instantly created of their physical space or room, portrayed on their mobile device, now with the option of saving the virtual architectural floorplan, by assigning a unique name to the room, within the context of the construction that contains it (ex. House, Living room, office, showroom etc.). Virtual space contains all the physical objects that virtual space contains.

Handling Objects in the Space. Once a virtual floorplan has been created and saved, the user will have the possibility virtually of "eliminating" any existing objects that was scanned within their original physical space, or not, allowing them to design a new empty (virtual) space or add to the existing objects; with new virtual objects (3D representations of objects that maintain their real appearance and proportion, according to available locations that are suggested to design their new space. At the end of this activity, the user has the possibility to save this space along with the collection of the objects (and the individual location of each object) that the user has added).

Managing the distribution and arranging of objects in a space. The user manages their new floorplan with options of expect designed layouts, suggestions for their room that are proportioned to their new virtual (floorplan) space where the user can properly add multiple new objects such as (furnishings, etc. as listened in section [0001]) as well as have the possibility of accommodating and changing the distribution of the objects added to that space until the distribution and arrangement are satisfactory to the user's liking. When finished, the user has the option to save these settings.

Create a collection in a virtual space. The user will have the ability to add objects (furniture, decorations, etc.) to the space, to a provided expert designed layout locations or where they desire. These objects in the space can be saved as a collection of objects; the user can have several collections for each space, which will be identified by a name and an alphanumeric value. A user will be able to bring a collection to the space at any time and will also be able to share the collection with other users of the platform.

Space Management. In the same way that a user can create collections in a space, a user can identify and create other spaces (bedrooms, kitchen, bathroom, garage, etc.) within a physical space (house, apartment, etc.). The user will have the ability to associate names and identifiers to each space, save them, and share them.

Defining the purpose of the Spaces. As part of Space Management, the user has the ability to define the purpose of a space, this implies being able to define if the space is a main room, the kitchen, a complete bathroom, a TV room, etc. This in order to be able to receive better suggestions regarding the type of objects to use in this space and the best practices for the distribution of these in that space.

Recommendations for the distribution and arrangement of objects in a space. Part of the platform's technology that the user will be able to exploit and use to their advantage involves being able to see the objects in an expert designed layout and in a designed rendering style to scale of their space, according to the best practices of interior design to accommodate and distribute the objects in the space, respecting the sizes and shapes of each object.

Interaction and integration with external (customer) object (product) catalogs. The platform includes the option of having a direct connection with a particular supplier/ design house's product catalog which would be available in the library. In this interaction, users will be able to search for products that fit their preferences and tastes, to add those objects to a space and create a collection.

Collection Purchase Process. At the end of the process, the user can individually or collectively select the objects (furniture, decoration, etc.) that they wish to acquire for the physical space. The user adds these objects to a shopping cart and completes a traditional e-commerce process and receives confirmation of their order, or will email the objects (furniture, decoration, etc.) and designed layout to the supplier/design house directly for them to order and deliver to client.

Request for services from a professional interior designer. The user will have one more option for the design of their space by having a professional designer to work on their space. The user will be able to request the help of a professional from the platform, or share their spaces, their collections and work from the platform with the selection of objects (furniture, decorations, etc.) and their positioning in the different ImaageQ spaces (main room, kitchen, TV room, etc.).

User and Role Management. The platform has a centralized module for unified management of users and roles, which will be applied to the various parts of the platform, permissions, accesses, etc.

The system and methodology of the invention will include a server which connects to the user through the user's computing device such as a smart phone through the internet. The server is the repository of all data generated by the user interactions with the application. The server includes or can access a memory that can serve as a repository of all data inputted or generated by the user interactions with the application. The server can include a partitioned database so that individual user's information is not accessible by other users or by anyone other than those associated with providing the system and those in control of the system.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

EXAMPLES

Example 1

A user downloads the app to a mobile device. The device is logged in to the Interior Design Platform. The user is instructed to use their device to scan the room. The scan produces a virtual floor plan with precise and accurate dimensions in 3 dimensions on the device. The scan includes windows, doors, vents, railings, furniture, and any other visible alterations or accessories. The user enters preferences and or demographics either prior to or after starting scanning. The user may instruct the device to start fresh, i.e., eliminate everything movable, or may eliminate or move items object by object. This creates a workspace for the interior decorating application.

Example 2

The user may request the generative AI functionality to create expert layouts for the user to consider and modify in real time. The generative AI will work from the room configuration, entries, windows, sloped ceilings, items remaining in the room, the user preferences, e.g., style, color schemes, items to add, etc., and demographic information to suggest likely preferences in a price range and availability date as determined. The user can select one or more suggested layouts and modify in real time, e.g., eliminating, substituting, moving, requesting a new item or a space to be filled. The generative AI is accessing the shop or shops in order to show actual layouts that would be available in accord with user preferences. The AI is updating user preferences based on the selections and eliminations.

Example 3

If the user has not accessed the generative AI layouts. The user chooses a suggested layout and accesses suggested items from the store inventory or availability. The app installs the item in the room. But the user is free to move it as desired. The user can select from available modifications to the item or may decide to eliminate it or select an alternate item from the suggestions.

Example 4

During the shopping experience with or without the generative AI suggestions, the user shops seamlessly with the generated suggestions to view and select from. The user can access the item, e.g., in a cart alone or with other items, and virtually distribute them one by one in the space which may be a room or a group of rooms. The augmented reality technology (AT) in the app continues to render 3D views of the room, allowing the user virtually to move about the space including an angular or top down view. Generative AI inputs can be requested at any time.

Example 4

When the user is satisfied with the items in the space, or maybe just a single item, the app can direct the user to the store for an on hands in person visit to touch and feel items or if preferred can access on line ordering and schedule deliveries. The app may contact an actual in-store person to arrange a scheduled visit or may offer available times for such visits. The app will transfer the special information including items to be added to the store to assure proper handling of the order.

Example 5

The user is unsure. The app allows the user to share the designs to a printer where several views may be printed, e.g., 2D that may include any views including top-down and from every entryway, or 3D. The designs may also be shared with another person for advice, e.g., a salesperson, a coworker, a mother, a daughter, a spouse, a friend, a client, etc.

The Examples are merely select embodiments available with practicing the present invention. The invention is set forth in the claims and is not to be limited by the Examples.

What is claimed is:

1. A system comprising:

a server having memory available for storing user interior design preference data and user demographic data;

at least one user device; and computer readable instructions available to the at least one user device and interacting with the server, the instructions operable to collect and store the at least one user's interior design preference data and demographic data on the server, the user device including means for scanning at least one room associated with the user to generate at least a 3D image of the room and physical dimensions of the room including elevation, the scanning means being capable of generating an augmented reality, scaled image of the scanned room including immovable objects and any preexisting movable objects associated with the at least one scanned room, the instructions being further operable to select one of the options of (i) allowing the server to serve at least one furnishing recommendation to the user's device based on the user's interior design preference data and demographic data, and (ii) allowing the user to make a first selection selected from one of (a) removing all preexisting movable objects to create an empty scanned room, (b) rearranging at least one of the preexisting movable objects, and (c) furnishing the empty scanned room based on a library of furnishing options, and the instructions including a generative AI program trained with at least the options selected by the user to refine future recommendations of the user.

2. The system according to claim 1, wherein the user demographic data includes data indicative of at least one of user age, gender, income, neighborhood, zip codes.

3. The system according to claim 1, wherein the movable objects within the floor plan include objects of furniture and the immovable objects and the immovable objects include at least one of windows, doors, walls, floors and ceilings, both the immovable and movable objects being associated with the scanned room.

4. The system according to claim 1, wherein the library of furnishing options is selectable by at least one of the user and the server.

5. The system according to claim 1, wherein the at least one user device includes means for permitting user addition and/or subtraction of furnishings to and/or from the at least one scanned room.

6. A method comprising:

storing on a server user interior design preference information and user demographic information; and scanning at least one room associated with a user device to generate at least a 3D image and physical dimensions of the room including elevation, the 3D image including movable and immovable objects and defining a floor plan, the server having access to the least one user device; and optionally selecting one of the options of (i) allowing the server to serve at least one furnishing, a recommended furniture layout having multiple furnishings for the at least one scanned room and (ii) at least one recommended article of furnishing for the at least one scanned room, wherein the option (i) and option (ii) recommendations are generated by an artificial intelligence (AI) model using the interior design preference data and user demographic data, selecting recommended furnishings for the furniture layout to form a furniture rendering, and training the AI model with at least the options selected by the user to refine future recommendations.

7. The method of claim 6, wherein the user demographic information data includes data indicative of at least one of user age, gender, income, neighborhood, zip codes.

8. The method according to claim 6, wherein the movable objects within the floor plan include objects of furniture and the immovable objects and the immovable objects include at least one of windows, doors, walls, floors and ceilings, both the immovable and movable objects being associated with the scanned room.

9. The method according to claim 6, further comprising providing a library of furnishing options generated by the AI model, and selecting between two options (i) a decorated room with recommended furnishings chosen by the AI model and (ii) individual pieces of furnishing recommended by the AI model but chose by the user.

10. The method according to claim 6, wherein the computer readable instructions are operable to permit user addition, subtraction and/or placement of furnishings from the 3D image of the scanned room.

11. The method of claim 6, further comprising displaying on the at least one user device a rendering of the scanned room with recommended and selected furnishing, and displaying a revised rendering of the scanned room as changes as to furnishings and locations are selected by the user based on server recommendations.

12. The method of claim 6, further comprising displaying on the user device initially selected furnishings and selecting alternative furnishings with the user device after the initially displayed furnishings are displayed.

13. The method of claim 11, further comprising:

displaying on the user device an option menu to accept said first selection or said at least one furnishing selection; and uploading said accepted selection to said server.

14. The method of claim 6, further comprising: connecting the user to a vendor of said first selection or said at least one furnishing recommendation and completing a sale and/or delivery.

15. The method of claim 14, further comprising establishing an ecommerce link between said user device and said vendor.

16. The method of claim 15, wherein said link to said vendor includes communication with a salesperson associated with said vendor.

17. The method of claim 15, wherein said link comprises an interface allowing said user to order delivery of said first selection.

18. The method of claim 11, further comprising sharing said revised 3D image with one of a person, an electronic device, and an application.

19. The method of claim 18, wherein the electronic device is a printer.

20. An interior design method comprising:

collecting information about a user's interior design preferences;

storing the user's interior design preferences on a server;

scanning a room with a user scanning device to generate scanned room data file which includes a floor plan and a 3-D image of the room having measured dimensions of the room including elevation, all immovable and movable objects within the room;

sending the scanned room data file to the server; and sending to the user's device from the server a first furniture layout for the scanned room, the first furniture layout including multiple movable articles of furniture, recommending articles of furniture for the furniture layout based on generative AI model trained at least in part with the user's interior design preferences, selecting recommended movable objects including articles of furniture to create a furniture rendering for the scanned room, optionally reselecting articles of furniture and optionally moving selected articles of furniture within the scanned room, and further training the AI model based on user selections.

21. The method according to claim 20, wherein all movable and non-preexisting objects are populated into a library by the server and based on a vendor library of optional movable objects.

22. The method according to claim 20, further comprising linking the user selections to a vendor of furniture, and acquiring the selections.

* * * * *